Patented Mar. 9, 1926.

1,575,855

UNITED STATES PATENT OFFICE.

HARRY E. MALI, OF CHICAGO, ILLINOIS.

BREAD AND THE LIKE AND PROCESS OF MANUFACTURING THE SAME.

No Drawing.   Application filed October 1, 1924. Serial No. 740,946.

*To all whom it may concern:*

Be it known that I, HARRY E. MALI, a citizen of the United States, residing at Chicago, in the county of Cook and State of Illinois, have invented new and useful Improvements in Bread and the like and Processes of Manufacturing the Same, of which the following is a specification.

The invention relates to bread and other baked articles and to a method of manufacturing the same.

It is well known that the crust of bread or other baked articles is frequently less desirable than the inner portion, and that in many cases the crust is trimmed off after slicing the bread. Attempts have been made to produce crustless bread by providing the loaf with a protective covering. But in spite of these disclosures, the old method of baking bread and the like still prevails.

It is an object of the invention to provide bread, rolls or other baked articles which have a crust in spaced relation from the article proper so that upon slicing the bread the crust automatically falls off, or may be conveniently removed.

A further object aims at providing a new method of baking bread whereby a crust is formed which is spaced from the body portion of the bread.

With these and other objects in view, the invention comprises the means and the sequence of steps pointed out in the following specification and particularly emphasized in the claims.

In producing bread in accordance with my invention, the dough is formed in the well known manner by kneading flour, meal or some species of grain into a dough adding thereto yeast for the purpose of fermentation.

Thereupon, from the dough so obtained, a portion thereof is rolled into a thin layer and to one surface thereof is applied a fatty substance such as butter fat.

If preferred, a thin layer may be formed from some other dough specially prepared for forming the crust.

After the dough is formed into loaves, the latter are each encased in the thin layer, so that each loaf is provided with an envelope of this dough spaced from the loaf proper by the fatty substance.

After the encased loaves rise under fermentation, they are exposed to baking temperature in an oven until thoroughly baked. When finished the loaf has a brittle crust which is spaced from the body portion and upon slicing the loaf, the crust will fall off or can be conveniently removed.

In describing the invention in connection with bread, it is not limited to this particular baked article, but other articles are included wherever my invention may be usefully applied.

The sequence of steps of my process may be varied.

It is not my intention to limit myself to the details described in my invention, but wish to include all changes fairly falling within the scope of my invention, as set forth in the appended claims.

I claim:—

1. Bread and other baked articles, comprising a body portion, and a crust spaced from the body portion.

2. Bread and other baked articles, comprising a body portion, and a crust of the same material as the body portion but spaced therefrom.

3. Bread and other baked articles, comprising a body portion, a crust, and means for preventing union of said crust and said body portion.

4. Bread and other baked articles, comprising a body portion, and a crust, separable from the body portion by pealing and leaving said body portion intact.

5. Bread and other baked articles, comprising a body portion, and a crust spaced from said body portion under the influence of a fatty substance.

6. The method of manufacturing bread and other baked articles, including the steps of forming the loaves from dough, and encasing the loaves in a layer of dough adapted to remain spaced from the loaves, and baking the loaves.

7. The method of manufacturing bread and other baked articles, including the steps of forming the loaves from dough, surrounding each loaf with a thin layer of dough provided on the inner surface with a fatty substance, and baking the loaves.

8. The method of manufacturing bread and other baked articles, including the steps of forming the loaves from dough, surrounding each loaf with a thin layer of dough provided with a fatty substance on the inner surface, permitting the loaves to rise, and baking the loaves.

In witness whereof I affix my signature.

HARRY E. MALI.